(12) United States Patent
Neijenhuis

(10) Patent No.: US 10,747,600 B2
(45) Date of Patent: Aug. 18, 2020

(54) EXTENSIBILITY FOR THIRD PARTY APPLICATION PROGRAMMING INTERFACES

(71) Applicant: commercetools GmbH, Munich (DE)

(72) Inventor: Christoph Neijenhuis, Berlin (DE)

(73) Assignee: commercetools GmbH, Munich (DE)

( * ) Notice: Subject to any disclaimer, the term of this patent is extended or adjusted under 35 U.S.C. 154(b) by 130 days.

(21) Appl. No.: 16/006,749

(22) Filed: Jun. 12, 2018

(65) Prior Publication Data

US 2019/0377620 A1 Dec. 12, 2019

(51) Int. Cl.
*G06F 9/54* (2006.01)
(52) U.S. Cl.
CPC .................................. *G06F 9/548* (2013.01)
(58) Field of Classification Search
CPC ........... G06F 9/541; G06F 9/547; G06F 9/548
See application file for complete search history.

(56) References Cited

U.S. PATENT DOCUMENTS

| | | | | |
|---|---|---|---|---|
| 2008/0256607 A1* | 10/2008 | Janedittakarn | .......... | H04L 63/08 726/4 |
| 2011/0041141 A1* | 2/2011 | Harm | ...................... | G06F 9/541 719/318 |
| 2017/0118077 A1* | 4/2017 | Liu | ......................... | H04L 41/50 |
| 2017/0192803 A1* | 7/2017 | Martori | ............... | G06F 9/45529 |
| 2018/0329697 A1* | 11/2018 | Klemenz | ................ | G06F 8/456 |
| 2019/0004879 A1* | 1/2019 | Chang | ................... | G06F 9/543 |

* cited by examiner

*Primary Examiner* — Brian W Wathen
(74) *Attorney, Agent, or Firm* — Nicholson De Vos Webster & Elliott LLP

(57) ABSTRACT

Techniques are disclosed for extending an API using remote, synchronous, user-defined extensions in a microservices environment. A request can be received to perform at least one action on at least one object type, the at least one action defined by an application programming interface (API). At least one extension associated with the at least one action and at least one object type can be determined. An object of the at least one object type and the at least one action can be performed on the object to generate an intermediate object. The intermediate object can be sent to the at least one extension for processing, the at least one extension hosted by a remote service. A response from the at least one extension can be received and the intermediate object can be updated based on the response.

18 Claims, 7 Drawing Sheets

```
Extension
  id - String
  version - Number
  key - String - Optional - User-specific unique identifier for the extension
  destination - Destination - Details where the extension can be reached
  triggers - Array of Trigger - Describes what triggers the extension
  additionalObjects - Object identifier or query for one or more objects to be passed
  createdAt - DateTime
  lastModifiedAt - DateTime
```

300 — (callouts) 302 id, 304 version, 306 key, 308 destination, 310 triggers, 312 additionalObjects, 314 createdAt, 316 lastModifiedAt

FIG. 3

EXTENSIBILITY FOR THIRD PARTY APPLICATION PROGRAMMING INTERFACES

BACKGROUND

Web-based applications are generally designed to broadly cover the needs of the application's customers. As such, an off-the-shelf application may not quite fit any one customer's needs. To address this, applications may provide various ways to modify or extend the application. For example, a customer may be enabled to modify the application's data model by specifying custom attributes and objects to tailor the application to their needs. Additionally, events may be used to asynchronously execute custom functions by the customer. For example, a customer can create a function and subscribe to events published by the application and the function may be called asynchronously. Likewise, a proxy layer can be used to call a custom function prior to calling the web-based application. Modifying the data model can only extend an application so far, and events are limited to asynchronous processing. Proxies also add significant complexity as many dozens of proxy applications must be separately managed and kept up to date.

BRIEF DESCRIPTION OF DRAWINGS

FIG. 3 illustrates an example extension definition, in accordance with various embodiments.

DETAILED DESCRIPTION

Figure 1:
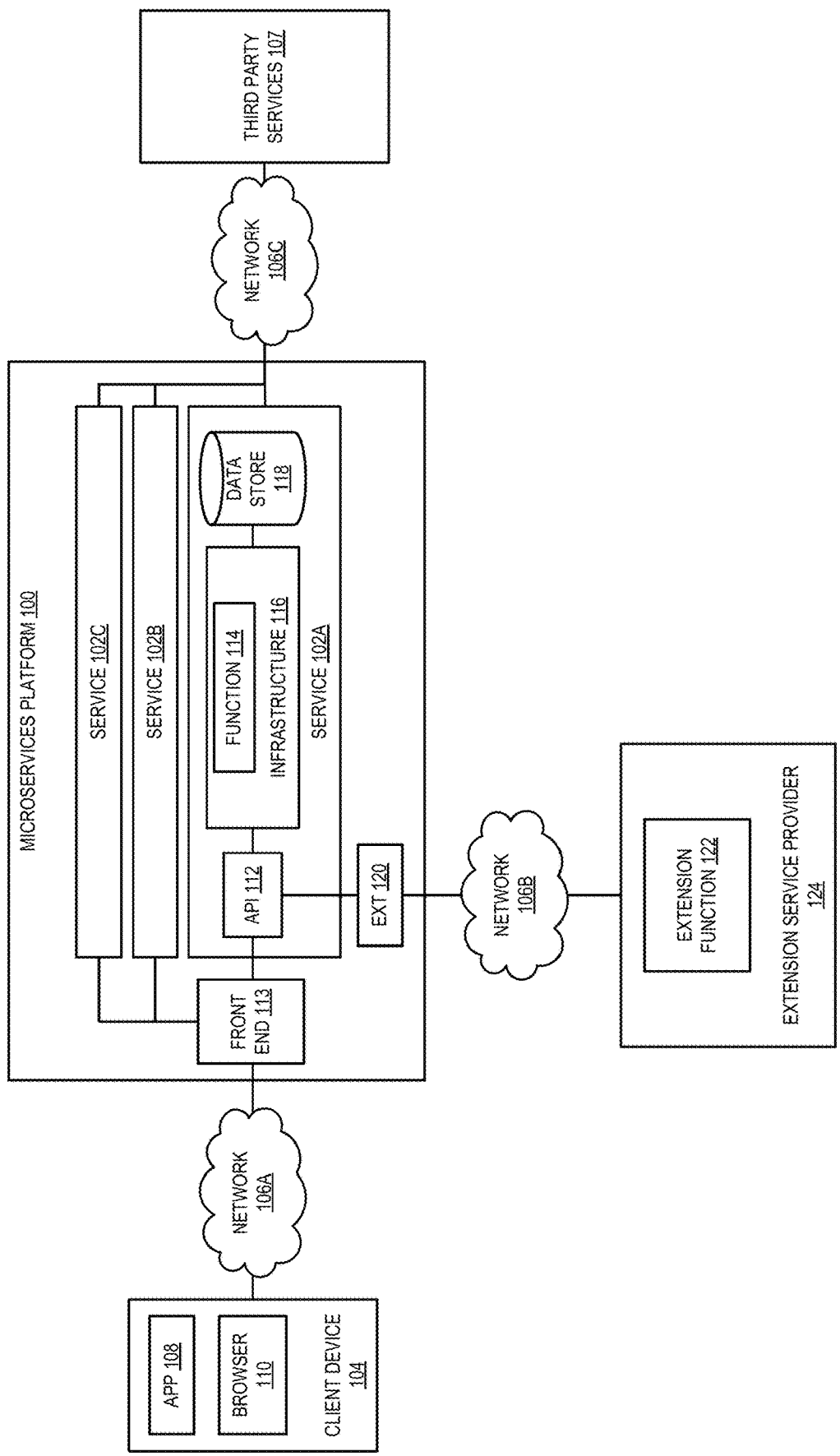
FIG. 1 illustrates an example of API extensibility in a multitenant architecture, in accordance with various embodiments

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

Past enterprise application systems have typically included monolithic applications which may be used to perform many different functions. If these functions did not exactly meet the needs of a given customer then the entire application needed to be updated and maintained across versions. A microservices architecture divides the different functions of a monolithic applications loosely coupled services which may be used to support a given application ad hoc, as they are needed by a given customer. Each service may provide particular functionality accessible through an application programming interface (or other interface). Microservices, and other multitenant architectures, are typically accessed by customers using hosted application programming interfaces (APIs), the APIs provide specific functionality for the service being accessed. However, to extend the functionality of any given service to meet the specific needs of a given customer can lead to the development of many different wrapper applications and/or asynchronous event management, which can lead to additional management and maintenance costs.

Techniques for extending application programming interfaces (APIs) in multitenant architectures are described herein. A request can be received to perform at least one action on at least one object type, the at least one action defined by an application programming interface (API). At least one extension associated with the at least one action and at least one object type can be determined. An object of the at least one object type and the at least one action can be performed on the object to generate an intermediate object. The intermediate object can be sent to the at least one extension for processing, the at least one extension hosted by a remote service. A response from the at least one extension can be received and the intermediate object can be updated based on the response.

Embodiments eliminate the need to track and manage wrapper applications and event processing across multiple clients. Additionally, because the extensions are synchronous, actions do not have to be rolled back or canceled when an asynchronous event determines that an earlier action is invalid. Also, fewer database calls are required as the extensions can operate on an intermediate object state and, once the extensions have updated the intermediate object state as needed, the resulting final state can be persisted once. Further, extensions may be hosted remotely, on network-accessible resources (e.g., servers, virtual machines, containers, serverless computing providers, etc.). This simplifies maintenance of the extensions, as the extension can be updated or modified in one location and thereafter each call associated with that extensions can call the updated extension, without having to manage the version maintained by each client device.

FIG. 1 illustrates an example of API extensibility in a multitenancy architecture, in accordance with various embodiments. Embodiments are described herein with reference to a microservices architecture for simplicity of explanation. Embodiments may be implemented in any multitenant architecture. For example, any service or system accessed via a hosted API may be extended according to the embodiments described herein. As shown in FIG. 1, a microservices platform 100 may include a plurality of different modular services 120A-102C. The services may be loosely coupled, such that a given customer can select a subset of services to use together to meet the specific needs of that customer. Instead of a single monolithic application that provides a plurality of different functions, each function can be split out into its own service. A customer may then choose to utilize some subset of the services that they need, effectively creating a custom application for the user including the services they regularly use. Such an architecture improves use and maintenance of the application, as each service is loosely coupled they can be maintained and updated separately, without requiring the entire monolithic application to be updated. Similarly, if any given service goes down, the rest of the services can still run while a new service instance is created and/or recovered.

A client device 104 can access the microservices platform 100 over one or more networks 106A, such as a local area network, mobile network, the Internet, etc. The client device can include a standalone application 108 or web browser 110 to send requests to, and receive responses from, the microservices platform. Each service 102 may include an application programming interface (API) 112 through which it is accessed. In some embodiments, a front-end application 113, API gateway, or other intermediary can receive requests from client devices 104 and then forward the request to the appropriate service API endpoint or generate a new request to send to the appropriate service API endpoint. Although front end 113 is shown as part of microservices platform 100, in various embodiments, front end 113 may be separately hosted from microservices platform and may call services 102A-102C over one or more networks.

As shown in FIG. 1, each service 102A-102C may be independent of, or loosely coupled from, one another. Each service can have its own API endpoint 112, and be backed by its own infrastructure 116. The infrastructure 116 may include one or more computing devices each with one or more virtual machine instances running thereon. Virtual machine instances may be created on-demand to service particular requests and/or may be running continuously to service requests as they are received. The infrastructure may be in a data center operated by the microservices platform 100 and/or may be provided by an infrastructure service provider, such as a cloud computing provider. Each service may also have its own data store 118 which may include a database, storage service, or other storage system. Each service may provide a separate function 114. For example, one service may perform inventory maintenance, one service may manage a product catalog, etc. In some embodiments, a client device may access a webpage or other front-end application 113 which then accesses services 120 provided by the microservices architecture (e.g., to construct the webpage, perform actions in response to inputs received from the client device, etc.).

In some embodiments, services 102A-102C may communicate with third party services 107. For example, third party service providers may include enterprise resource planning (ERP) services, customer relationship management (CRM) services, identity management (IdM) services. Services 102A-102C may utilize the third-party services to perform functions 114 response to requests from clients 104. For example, a service 102A may authenticate and/or authorize a user using a third party IdM prior to performing the function 114 in response to a request received from client device 104. In some embodiments, the third-party services 107 may be accessed over one or more networks 106B, which may include the same or different networks as network 106A.

Each API 112 exposes particular actions related to function 114. The API can be implemented as a representational state transfer (REST) API, command query responsibility segregation (CQRS) API, or other API. The APIs are limited to specific actions defined by the API and the service's function. As discussed above, a number of different ways to extend the functionality of a given API have been implemented. However, these lead to additional problems, such as increased management and maintenance costs. Embodiments address the limitations of previous solutions to extend APIs using extensions defined at an arbitrary location corresponding to a uniform resource identifier (URI). The extensions can be defined with the URI and one or more trigger conditions associated with the API. As discussed, in some embodiments, the API may implement a CQRS model in which one or more commands are sent to the service and then executed to modify a given object. When the one or more trigger conditions are met (e.g., when specific commands are received), the extension can be called synchronously. The call may include an intermediate state of an object created and/or modified by the initial API call. The extension can then be executed to update the intermediate state into a final state, which may then be persisted and returned to the API-caller and/or client.

As shown in FIG. 1, a user can define one or more extension functions 122 in an extension service provider 124. The extension service provider may include a serverless computing provider. A serverless computing provider may execute application logic on demand, rather than on dedicated servers, virtual machine (VM) instances, containers, etc. For example, when a request is received by the extension service provider 124 a VM or container can be instantiated or deployed which includes the extension function. The extension function can then be executed and a response returned to the requestor (e.g., in this example service 102A). The VM or container can then be taken out of service. This way, resources are made available on demand, and not maintained as dedicated resources to perform the extension function. Each serverless function may define application logic and can be associated with a URI endpoint, such as a uniform resource locator (URL) address, that may be accessed over one or more networks 106C. When the extension URI is accessed, the application logic can be executed and a response returned.

As shown in FIG. 1, an application running on the client 104 (e.g., an application implementing a software development kit (SDK), a REST client, etc.) calls a service API 112. As discussed above, in some embodiments, the client application may call an API gateway or other API intermediary rather than the service API directly. The function implemented by the service can then generate a client-agnostic representation of an object being manipulated by the API call (e.g. a cart object, a customer profile, etc.). In some embodiments, the representation may be a JavaScript Object Notation (JSON) or other representation. Under previous systems, the representation would then be persisted to the internal datastore 118 and returned to the client 104. However, in accordance with various embodiments, the service can identify an extension 120 that has been triggered by the API call. Extensions 120 may be a data structure including one or more extensions associated with the service 102A, an account associated with the client device, and/or a developer associated a front-end application 113 being accessed by the client 104. Each extension triggered by the API call can be passed the object representation and can be executed in parallel. In some embodiments, one or more of the extensions can be executed in a particular sequence. For example, an extension definition can include a dependency on another extension, such as an extension identifier for the extension on which it depends. The extension can execute an extension function on the object representation. This may include requesting changes through the API, as may be requested by a client device, to create a modified object representation. The modified object representation can then be persisted to the service datastore and a response is then returned to the requesting client. Alternatively, the extension can return an error, which is returned to the client and nothing is persisted. In some embodiments, a timeout error can be returned if an extension takes longer than a configurable time to respond. For example, the timeout error can be returned to front end 113 which may retry the extension or return an error to the client device.

In some embodiments, when an extension is called if the extension function does not need to perform any changes to the intermediate object, it can simply return a success indication and the microservices platform can the object. If the extension function determines the object is invalid or cannot perform an update defined by the extension function, it can return one or more errors. The microservices platform then does not persist the result, and can return the one or more errors to the original caller of the API. If the extension determines one or more changes are to be made to the object, it can return a list of updates. The updates can be a list of commands to perform on the object (e.g., add a required item to a cart object, calculate a value adjustment, etc.). The microservices platform can then attempt to perform the updates. If any of the updates fail, the original caller of the API will receive the errors. If the updates are successful, the modified object can be persisted and the original caller can receive the final result.

In some embodiments, an extension can be called via an HTTP POST request. In some embodiments, for extensions implemented as serverless functions, the serverless function can be invoked, and the intermediate object can be provided as the payload. For example, if the intermediate object is a JSON representation, the following JSON body will be sent:

action—String resource—JSON representation of the intermediate object

In various embodiments, the object can be persisted as-is if no extension returns errors or updates. Some fields, such as the lastModifiedAt field or createdAt field may be updated while other fields may be persisted if they are not overridden by an update of an extension.

An extension with an HTTP destination can set an HTTP status code in response (e.g., 200 or 201 for successful responses, 400 for validation failures). All other status codes can be treated as a failure to respond properly. An extension with a serverless function destination may be considered successful if it is returned without errors (e.g., both for successful responses, and validation failures). If an exception or failure is returned, the extension can be considered to have failed to respond properly.

For example, if the validation was successful and no updates are being sent, the response may include an empty body and/or an empty list of requested updates. For HTTP extensions, the response may include a 200 or 201 HTTP status code. If the validation fails, an array of errors can be returned and an HTTP status code of 400 can be set. For a serverless function, if validation fails a "FailedValidation" string or other failure indication can be added to the response. Errors may include a description of the error and an error code.

If updates are requested, an array of updates can be included. In some embodiments, the number of updates that can be included may be restricted to a configurable number (e.g., 50 updates, 100 updates, etc.). As discussed, the updates may include any API commands, as though they were received from a client or other entity. For HTTP extensions, the response can include a 200 or 201 HTTP status code. For serverless extensions, an "UpdatesRequested" string or other indication can be added to the response.

In some embodiments, if an API extension fails to respond properly, the whole API call may fail. For example, if the API extension did not return a result in time or could not be reached, the original API caller may receive an error, such as a 504 Gateway Timeout HTTP status code. If the API extension did return a response, but it could not be parsed properly, the original API caller may receive a 502 Bad Gateway HTTP status code.

In some embodiments, API Extensions may include client defined validations. For example, a cart object may be limited to a specific number of items. Other examples may include determining a value associated with a cart object and adding additional items to the cart as defined by the extension, such as shipping requirements, insurance requirements, valuation changes, etc. As discussed, the extensions may be called after processing the commands received in the API call (e.g., create, update, etc.) as defined by the triggering conditions of the extension. Once the commands are executed an intermediate state of the object can be sent to the extension to be further processed (e.g., validated, updated, modified, or otherwise processed according to the logic defined in the extension function).

In some embodiments, the extension may receive additional object representations in addition to the object being manipulated by the API call. For example, an extension may be defined to perform account-specific modifications to an object and therefore may receive a customer profile object representation in addition to a cart object representation to make customer profile-specific changes to the cart object. The additional object(s) may be specified by one or more object identifiers corresponding to specific additional objects, or using an object query which may identify the additional objects based on characteristics of the additional objects. The object query may describe a relationship between the object being manipulated and one or more additional objects. For example, if a "cart" object is being manipulated, the extension definition may include a query for an "account" object that owns the "cart" object. In various embodiments, the object query may be provided in any appropriate query language or other representation. Rather than defining the extension to separately request the other object representation, the extension definition can include one or more object identifiers or an object query which can be sent with the object representation being manipulated, thus saving additional requests and improving the functioning of the system.

In some embodiments, an extension may be triggered each time its associated API call is called. For example, each time an "update" action is called in a given API, an associated validation extension may be executed which may then execute a function to ensure the changes being updated are valid. In some embodiments, a predicate language can be used to define fine-grained triggering, such that extensions are only called when fine-grained conditions are met. Example predicates may include:

country="US"

shippingAddress has changed lineItems(quantity has changed)

As such, using predicate triggering, an extension may only be called if specific fields of the object are changed or updated. Additionally, regional extensions may be defined. For example, if a call is made from a one country then a first extension may be called, whereas if the call is made from a second country then a second extension may be called. By using predicate-based triggering, fewer extensions may be called leading to more efficient processing of requests.

Embodiments are described herein with respect to calling an extension after one or more commands have been executed on an object by an API. However, in some embodiments, when one or more commands are received by the API, the current state of the object can be loaded and any triggered extensions can be called first, rather than waiting for the commands to be executed on the object.

As described above, in various embodiments users can define custom extensions to be executed upon detection of particular conditions, such as a particular API call and/or predicate-based triggering. However, in some embodiments, commonly used extensions may be provided by the microservices platform. In some embodiments, the extensions may be defined for specific common use cases associated with a given service. These extensions may be made available through an app store or other repository operated by the microservices platform. In some embodiments, the extensions can then be implemented by users in a server, virtual machine, container, and/or serverless computing provider of their choice. The extension can be implemented as is or modified by the user as needed.

As discussed, multiple extensions may be triggered by an API call. In such an embodiment, the extensions may be called in parallel (unless any of the extensions define an extension dependency). The responses received from the extensions can be merged, but without a guaranteed order (e.g. if two extensions each return an error, their order in the error list is undefined. If two extensions return updates, the order in which the updates are performed is undefined). In some embodiments, responses can be merged based on their priority/severity. For example, a failure to respond properly by any API extension can cause the whole request to fail with a 502 or 504 HTTP status. If any API extension finds that the intermediate object is not valid, the result may not be persisted and an error can be returned to the original caller of the API. If any API extension returns updates, the result will be modified before being persisted and returned to the original caller of the API. Updates can be applied to the intermediate state of the object as they are received, unless an extension defines an extension dependency, as discussed above.

Figure 2:
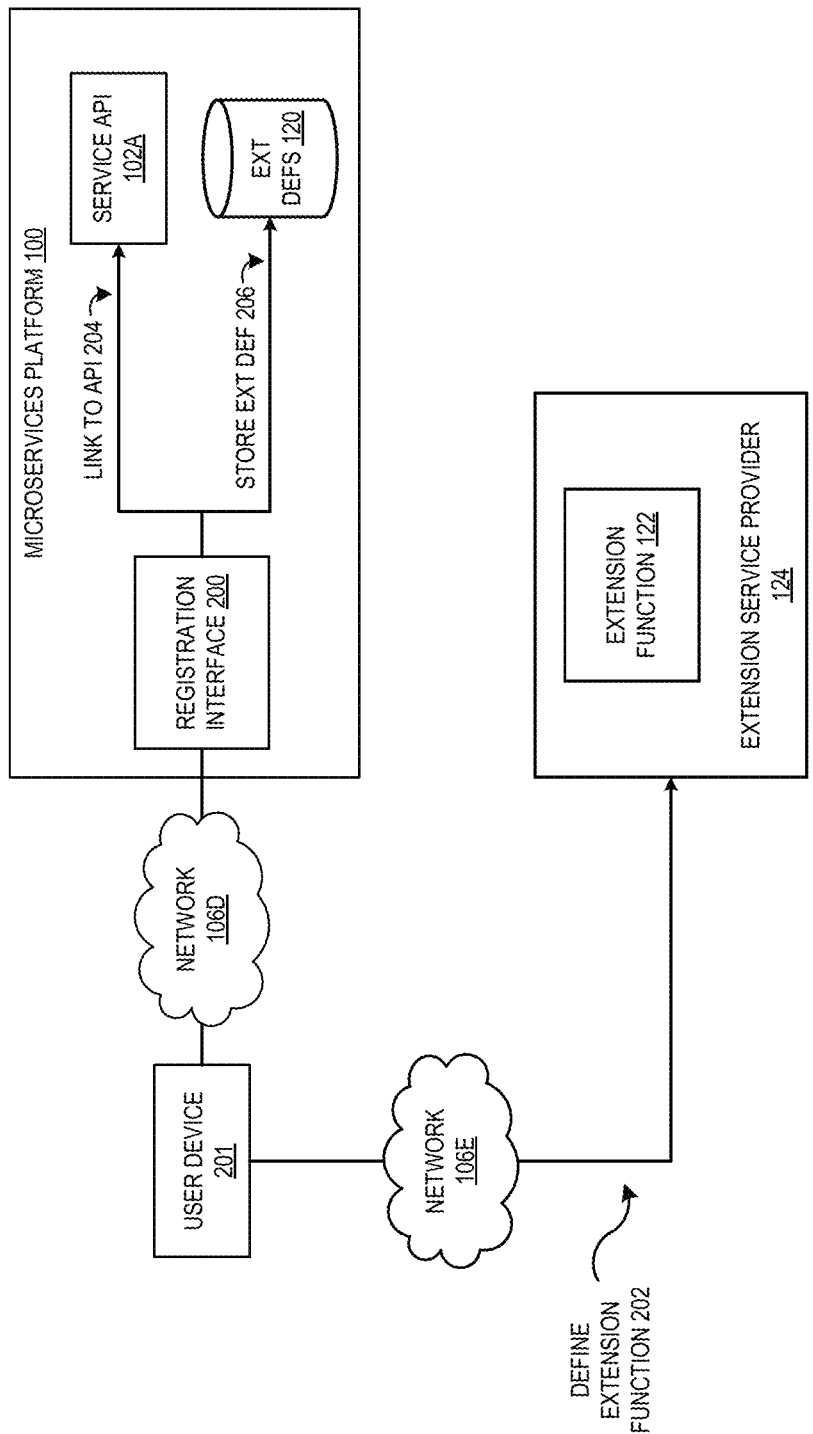
FIG. 2 illustrates an example of registering an API extension, in accordance with various embodiments.

FIG. 2 illustrates an example of registering an API extension, in accordance with various embodiments. As shown in FIG. 2, microservices platform 100 may include an extension registration interface 200. A user device 201, such as a developer, administrator, or other user device can access the registration interface over network 106D. For example, registration interface 200 may expose an API, graphical user interface, or other user interface through which extension definitions can be received. The user device can define an extension 202 with an extension service provider 124. As discussed, the extension service provider can be a serverless computing provider, a server, virtual machine instance, or container having an HTTP endpoint, or other service provider capable of hosting an extension function 122. Once the extension function has been defined, the user device can provide an extension definition including a URI for the extension function to registration interface 200. The extension function can then be linked 204 to the service API and stored 206 in extension definitions 120.

FIG. 3 illustrates an example extension definition 300, in accordance with various embodiments. As shown in FIG. 3, extension definition 300 can include an identifier 302 and a version 304 of the extension. For example, the identifier can be a name or other string identifier of the extension. The identifier can be used by the microservices platform to call a specific extension when more than one extension is hosted at the same endpoint. In some embodiments, a user-specific key 306 can be included in the extension definition. The key may be an identifier that is used internally by the user.

In some embodiments, destination 308 can include any information needed for the microservices platform to call the extension. For example, an HTTP destination may include a type string (e.g., "HTTP") and a URL string. In some embodiments, the HTTP destination may further include authentication information, such as an authorization header including a header value. The URL string may be to an encrypted HTTPS connection or an unencrypted HTTP connection. For serverless extensions, an HTTP destination may also be used (e.g., for serverless functions having an HTTP endpoint. In some embodiments, serverless extension destinations can include a reference to the function provided by the serverless computing provider. The destination may also include authentication and/or authorization information such as an access key and access secret.

The extension definition may also include triggers 310. As discussed, the triggers may include a resource type identifier, such as an identifier for a type of object being manipulated, and one or more actions, which may be an array of strings corresponding to actions being performed using the service API on the type of object. If microservices system 100 determines that an object of the specified type is having one of the specified actions performed on it, the object, as modified by the action can then be sent to the triggered extension or extensions. In some embodiments, the trigger 310 may also include predicate language defined triggers. As discussed, the predicate language can be used to define fine-grained triggering, such that extensions are only called when fine-grained conditions are met.

In some embodiments, extension definition 300 can include additional objects 312 to pass to the extension with the object being modified. As discussed, the extension may receive additional object representations in addition to the object being manipulated by the API call. For example, an extension may be defined to perform account-specific modifications to an object and therefore may receive a customer profile object representation in addition to a cart object representation to make customer profile-specific changes to the cart object. By including the object types to be passed with the object being modified, additional request and response calls to obtain the object can be saved, improving the efficiency of the system. As shown in FIG. 3, in some embodiments, the extension definition may also include time stamps indicating when the extension was created and/or last modified.

Figure 4:
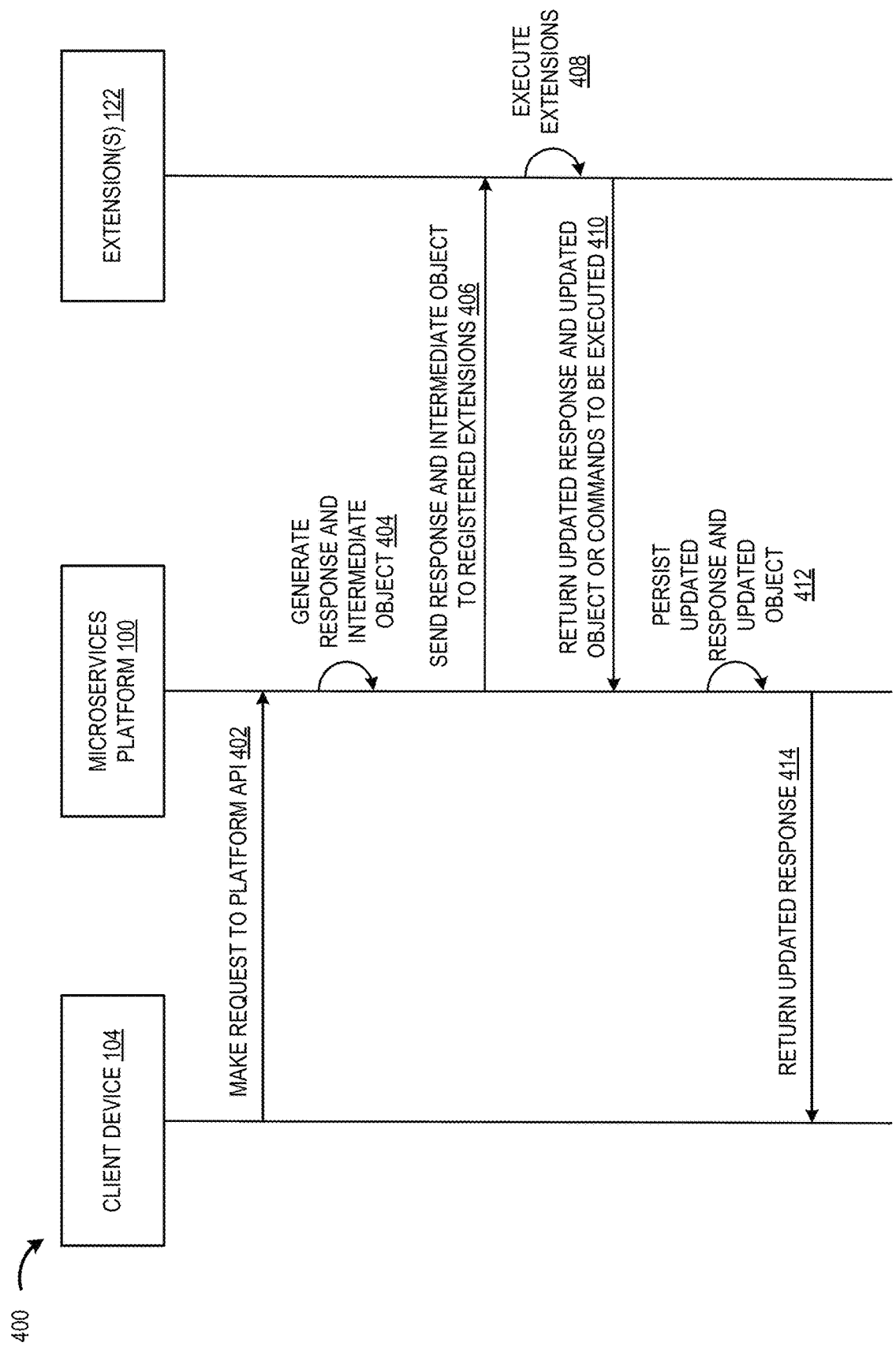
FIG. 4 illustrates a sequence diagram of using an API extension in a microservices platform, in accordance with various embodiments.

FIG. 4 illustrates a sequence diagram 400 of using an API extension in a microservices platform, in accordance with various embodiments. As shown in FIG. 4, an application running on the client 104 (e.g., an application implementing a software development kit (SDK), a REST client, etc.) can make a request 402 to an API at microservices platform 100. As discussed above, in some embodiments, the client application may call a front-end application, API gateway, or other API intermediary rather than calling a service API directly. The request may include one or more commands to be executed by a service provided by microservices platform 100. The commands (e.g., create, update, etc.) may then be executed to generate a response and intermediate object 404. For example, the function implemented by the service can generate a client-agnostic representation of an object being manipulated by the API call (e.g. a cart object, a customer profile object, etc.). In some embodiments, the representation may be a JavaScript Object Notation (JSON) or other representation.

If no extensions are registered for any of the commands included in the request 402 then the intermediate object may be persisted and a response returned to the client device. However, if one or more extensions are registered for any of the commands included in the request, then the response and intermediate object generated at 404 can be sent 406 to the registered extensions 122. The extensions may be identified by the service based on extension definitions provided by the user and stored in the microservices platform. The response and intermediate object can be sent to the extension at 406 to a URI defined in the corresponding extension definition. Each extension triggered by the API call can be passed the object representation and can be executed 408. As discussed, the extensions may be executed in parallel or in a particular sequence. For example, an extension definition can include a dependency on another extension, such as an extension identifier for the extension on which it depends. Each extension can execute an extension function on the object representation. This may include requesting changes through the API, as may be requested by a client device, to create a modified object representation. The modified object representation, or the requested changes through the API (e.g., a list of commands), and response can then be returned 410 to the microservices platform and persisted 412 to the service datastore. For example, where a list of commands is returned by an extension, those commands may be executed to update the intermediate object to create the updated object. The updated object may then be persisted. A response is then returned 414 to the requesting client (e.g., front end application, client device, etc.). Alternatively, the extension can return an error, which is returned to the client and nothing is persisted. In some embodiments, a timeout error can be returned if an extension takes longer than a configurable time to respond.

Figure 5:
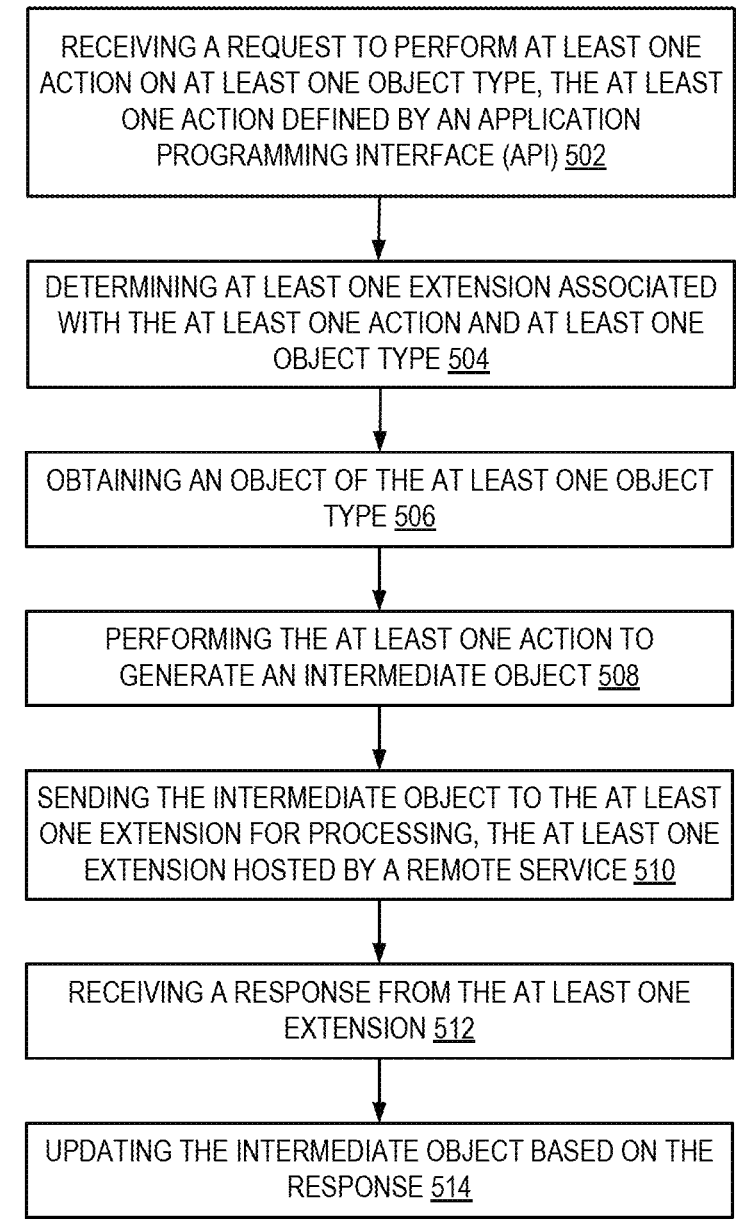
FIG. 5 illustrates a method of using an API extension in a multitenant architecture, in accordance with various embodiments.

FIG. 5 illustrates a method of using an API extension in a multitenant architecture, in accordance with various embodiments. As shown at 502, a request can be received to perform at least one action on at least one object type, the at least one action defined by an application programming interface (API). As shown at 504, at least one extension can be determined to be associated with the at least one action and at least one object type.

In some embodiments, the at least one extension is associated with an extension definition, the extension definition specifying a destination for the extension and one or more triggers, the one or more triggers including the at least one object type and the at least one action definition. In some embodiments, the one or more triggers further include at least one predicate trigger, the at least one predicate trigger defining at least one field value associated with the at least one action. The extension definition can further include an object query, wherein when the intermediate object is obtained, at least one additional object identified using the object query is obtained and the at least one additional object is sent to the at least one extension with the intermediate object.

At 506, an object of the at least one object type; can be obtained. As discussed, this may be a newly created object or the current state of an existing object. At 508, the at least one action can be performed to generate an intermediate object. At 510 the intermediate object can be sent to the at least one extension for processing, the at least one extension hosted by a remote service. In some embodiments, the intermediate object can be sent to an endpoint specified by the destination for the at least one extension, the endpoint comprising one of an HTTP endpoint or a serverless computing provider endpoint.

At 512, a response can be received from the at least one extension. At 514, the intermediate object can be updated based on the response. In some embodiments, a plurality of responses can be received from a plurality of extensions, each of the plurality of responses including at least one command to be executed on the intermediate object. At least one extension dependency can be determined using at least one extension definition. The at least one command received from each of the plurality of extensions can be executed in an order based on the at least one extension dependency. In some embodiments, a plurality of responses can be received from a plurality of extensions, each of the plurality of responses including at least one command to be executed on the intermediate object. The at least one action received from each of the plurality of extensions can be executed in an order based on when each of the plurality of responses is received.

Figure 6:
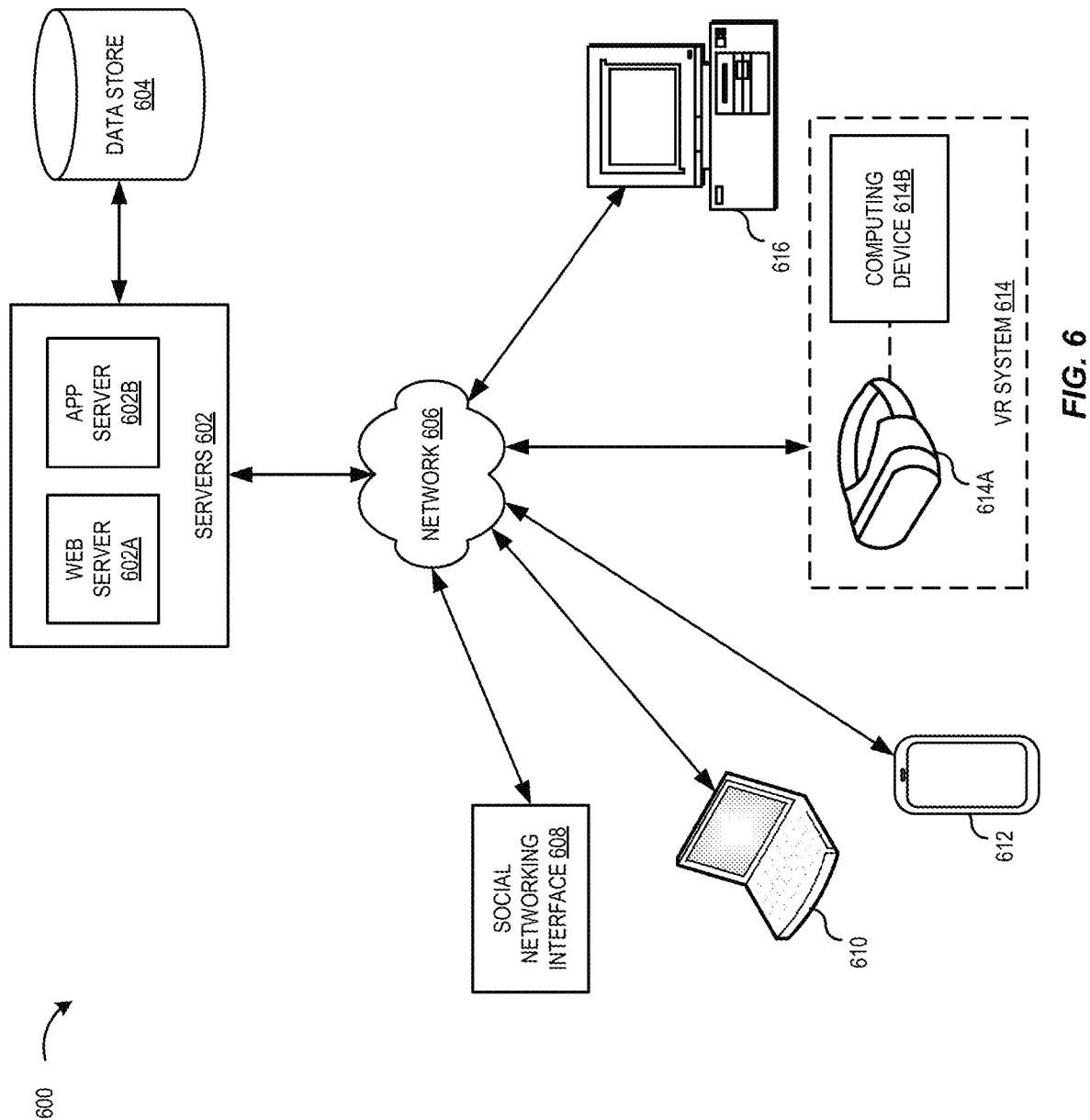
FIG. 6 illustrates an example of a networked computing environment, in accordance with various embodiments.

FIG. 6 illustrates an example of a networked system environment, in accordance with various embodiments. As shown in FIG. 6, system environment 600 may include one or more servers 602, such as a web server 602A to receive web-based requests from one or more client devices and application server 602B to execute one or more applications. The servers 602 can receive messages, including REST-based messages, requests, and/or other data, from various client devices or entities. For example, social media interface 608 may facilitate communication between various social media networks with servers 602 via network 606. Client devices 610-616 may execute an application such as an SDK-based application, web browser, or other application. In various embodiments, client devices 610-616 may communicate with at least one server computer 602 over one or more networks 606.

In some embodiments, the client devices 610-616 may include a general purpose personal computer, such as a desktop 616, laptop 610, or other personal or workstation computer running one or more operating systems (e.g., Microsoft Windows, Apple macOS, iOS, Android, Unix or Unix-based OS, or other operating systems), and/or a mobile device 612, including smartphones, tablet computers, or PDAs. In some embodiments, the client devices may include a virtual reality (VR) or augmented reality (AR) system (collectively "VR system") 614. The VR system 614 can include a VR enabled gaming console or computing device 614B, including a head mounted display (HMD) 614A. In some embodiments, the client device may include an HMD with all necessary computing resources integrated therein such that a separate computer or gaming console is not required to drive the HMD. Although system environment 600 includes six client devices, any number of network-enabled client devices may be supported. Other devices such as devices with sensors, etc. may interact with server 602.

Client devices 610-616 can communicate with at least one server computer 602 over network 606. Network 606 may be any type of network familiar to those skilled in the art that can support data communications using any of a variety of commercially-available protocols, including such as TCP/IP or other suitable protocols. Network 606 may be a wired or wireless local area network (LAN or WLAN), such as an Ethernet network, a wireless network operating using an IEEE 802.11 suite of protocols, the Bluetooth protocol known in the art, and/or any other wireless protocol); and/or any combination of these and/or other networks. Server computer 614 which may include general purpose computers, specialized server computers, server clusters, or any other appropriate computing device capable of running the services and/or applications discussed herein. Server 602 may run an operating system including any of those discussed above and server applications, including HTTP servers, FTP servers, CGI servers, Java servers, database servers, or other server applications.

Server 602 can communicate with one or more data stores 604 which may be located locally at server 602 or may be located remotely and accessed over one or more networks (not shown) or over a storage-area network (SAN). In some embodiments, data store 604 may include one or more databases, such as relational databases, or a storage service, such as an object data store, block data store, or other cloud or network-based storage service.

Figure 7:
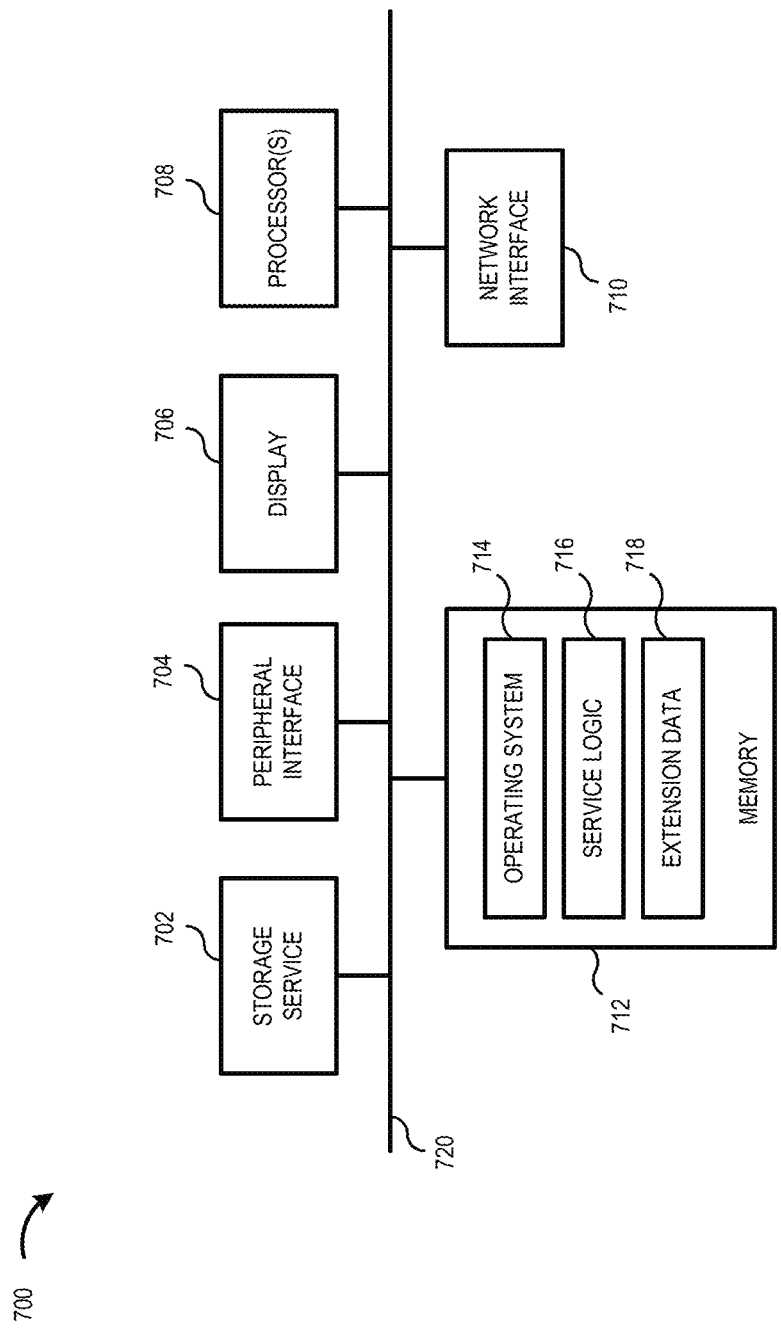
FIG. 7 illustrates an example of a computer system, in accordance with various embodiments.

FIG. 7 illustrates an example of a computer system, in accordance with various embodiments. For example, the systems discussed herein may be implemented using computer systems such as that shown in FIG. 7. Computer system 700 can include various components coupled via a bus 720. The components may include a storage system or storage system interface 702 which may provide read/write access to one or more non-transitory computer readable storage media. The storage media may be located locally or remotely, and may be accessed directly or through a storage service, such as an object data store, block data store, or other cloud or network-based storage service. The storage media may include devices such as disk drives, optical storage devices, and solid-state storage devices such as a random-access memory (RAM) and/or a read-only memory (ROM), which can be programmable, flash-updateable and/or the like.

The computer system may also include a peripheral device interface 704 which can enable the computer system to communicate with input devices (e.g., a mouse, a keyboard, external storage readers, image capture devices, etc.), and an output device interface 706 which may provide output to one or more devices, such as a display device, head mounted display, wearable device or sensor, printers, etc. Processors 708 may include single or multicore CPUs, graphics processing units (GPUs), a digital signal processor (DSP), physics processing units, a special-purpose processor, an application specific integrated circuit (ASIC), application-specific instruction-set processors, field-programmable gate array (FPGA) devices, coprocessors, network processing units, audio processing units, encryption processing units, or other processing device. Computer system 700 may include a network interface 710, which may include one or more of a network card, wireless communication module (e.g., 802.11 compatible wireless module, Bluetooth module, etc.), wired network interface such as an ethernet card, an infra-red communication device, etc.

Computer system 700 may also include memory 712 which may include RAM, ROM, EEPROM, flash memory or other memory technology, CD-ROM, digital versatile disk (DVD) or other optical storage, magnetic storage devices, or any other storage medium. Memory 712 may include software, such as operating system code 714, application programs such as a client application, Web browser, RDBMS, etc. Memory 712 may also include applications as discussed herein, such as service logic 716 and API extension data 718.

Embodiments discussed herein can be implemented in hardware, software, firmware, or combinations thereof. Consequently, features of the present invention may be implemented using a processing system (e.g., including one or more processors). As discussed, embodiments may be implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

While various embodiments of the present invention have been described above, it should be understood that they have been presented by way of example, and not limitation. It will be apparent to persons skilled in the relevant art that various changes in form and detail can be made therein without departing from the spirit and scope of the invention.

What is claimed is:

1. A method, comprising:
   receiving a request to perform at least one action on at least one object type, the at least one action defined by an application programming interface (API);
   determining at least one extension associated with the at least one action and at least one object type, wherein the at least one extension is associated with an extension definition, the extension definition specifying a destination for the extension and one or more triggers, the one or more triggers including the at least one object type and the at least one action definition;
   obtaining an object of the at least one object type;
   performing the at least one action to generate an intermediate object;
   sending the intermediate object to the at least one extension for processing, the at least one extension hosted by a remote service;
   receiving a response from the at least one extension; and
   updating the intermediate object based on the response.

2. The method of claim 1, wherein sending the intermediate object to the at least one extension for processing further comprises:
   sending the intermediate object to an endpoint specified by the destination for the at least one extension, the endpoint comprising one of an HTTP endpoint or a serverless computing provider endpoint.

3. The method of claim 1, wherein the one or more triggers further include at least one predicate trigger, the at least one predicate trigger defining at least one field value associated with the at least one action.

4. The method of claim 1, wherein the extension definition further includes an object query, wherein when the intermediate object is obtained, at least one additional object identified using the object query is obtained and the at least one additional object is sent to the at least one extension with the intermediate object.

5. The method of claim 1, wherein updating the intermediate object based on the response further comprises:
   receiving a plurality of responses from a plurality of extensions, each of the plurality of responses including at least one command to be executed on the intermediate object;
   determining at least one extension dependency using at least one extension definition; and
   executing the at least one command received from each of the plurality of extensions in an order based on the at least one extension dependency.

6. The method of claim 1, wherein updating the intermediate object based on the response further comprises:
   receiving a plurality of responses from a plurality of extensions, each of the plurality of responses including at least one command to be executed on the intermediate object;
   executing the at least one action received from each of the plurality of extensions in an order based on when each of the plurality of responses is received.

7. A system, comprising:
   at least one processor; and a computer readable storage medium including instructions stored thereon which, when executed by the processor, cause the system to:

receive a request to perform at least one action on at least one object type, the at least one action defined by an application programming interface (API);

determine at least one extension associated with the at least one action and at least one object type, wherein the at least one extension is associated with an extension definition, the extension definition specifying a destination for the extension and one or more triggers, the one or more triggers including the at least one object type and the at least one action definition;

obtain an object of the at least one object type;

perform the at least one action to generate an intermediate object;

send the intermediate object to the at least one extension for processing, the at least one extension hosted by a remote service;

receive a response from the at least one extension; and update the intermediate object based on the response.

8. The system of claim 7, wherein the instructions to send the intermediate object to the at least one extension for processing, when executed, further causes the system to:

send the intermediate object to an endpoint specified by the destination for the at least one extension, the endpoint comprising one of an HTTP endpoint or a serverless computing provider endpoint.

9. The system of claim 7, wherein the one or more triggers further include at least one predicate trigger, the at least one predicate trigger defining at least one field value associated with the at least one action.

10. The system of claim 7, wherein the extension definition further includes an object query, wherein when the intermediate object is obtained, at least one additional object identified using the object query is obtained and the at least one additional object is sent to the at least one extension with the intermediate object.

11. The system of claim 7, wherein the instructions to update the intermediate object based on the response, when executed, further causes the system to:

receive a plurality of responses from a plurality of extensions, each of the plurality of responses including at least one command to be executed on the intermediate object;

determine at least one extension dependency using at least one extension definition; and execute the at least one command received from each of the plurality of extensions in an order based on the at least one extension dependency.

12. The system of claim 7, wherein the instructions to update the intermediate object based on the response, when executed, further causes the system to:

receive a plurality of responses from a plurality of extensions, each of the plurality of responses including at least one command to be executed on the intermediate object;

execute the at least one action received from each of the plurality of extensions in an order based on when each of the plurality of responses is received.

13. A non-transitory computer readable storage medium including instructions stored thereon which, when executed by one or more processors, cause the one or more processors to:

receive a request to perform at least one action on at least one object type, the at least one action defined by an application programming interface (API);

determine at least one extension associated with the at least one action and at least one object type, wherein the at least one extension is associated with an extension definition, the extension definition specifying a destination for the extension and one or more triggers, the one or more triggers including the at least one object type and the at least one action definition;

obtain an object of the at least one object type;

perform the at least one action to generate an intermediate object;

send the intermediate object to the at least one extension for processing, the at least one extension hosted by a remote service;

receive a response from the at least one extension; and update the intermediate object based on the response.

14. The computer readable storage medium of claim 13, wherein the one or more triggers further include at least one predicate trigger, the at least one predicate trigger defining at least one field value associated with the at least one action.

15. The non-transitory computer readable storage medium of claim 14, wherein the instructions to send the intermediate object to the at least one extension for processing, when executed, further causes the one or more processors to:

send the intermediate object to an endpoint specified by the destination for the at least one extension, the endpoint comprising one of an HTTP endpoint or a serverless computing provider endpoint.

16. The non-transitory computer readable storage medium of claim 14, wherein the extension definition further includes an object query, wherein when the intermediate object is obtained, at least one additional object identified using the object query is obtained and the at least one additional object is sent to the at least one extension with the intermediate object.

17. The non-transitory computer readable storage medium of claim 13, wherein the instructions to update the intermediate object based on the response, when executed, further causes the one or more processors to:

receive a plurality of responses from a plurality of extensions, each of the plurality of responses including at least one command to be executed on the intermediate object;

determine at least one extension dependency using at least one extension definition; and execute the at least one command received from each of the plurality of extensions in an order based on the at least one extension dependency.

18. The non-transitory computer readable storage medium of claim 13, wherein the instructions to update the intermediate object based on the response, when executed, further causes the one or more processors to:

receive a plurality of responses from a plurality of extensions, each of the plurality of responses including at least one command to be executed on the intermediate object;

execute the at least one action received from each of the plurality of extensions in an order based on when each of the plurality of responses is received.

* * * * *